W. SCHELBLE.
MACHINE FOR MAKING BOXES.
APPLICATION FILED APR. 30, 1914. RENEWED APR. 19, 1919.

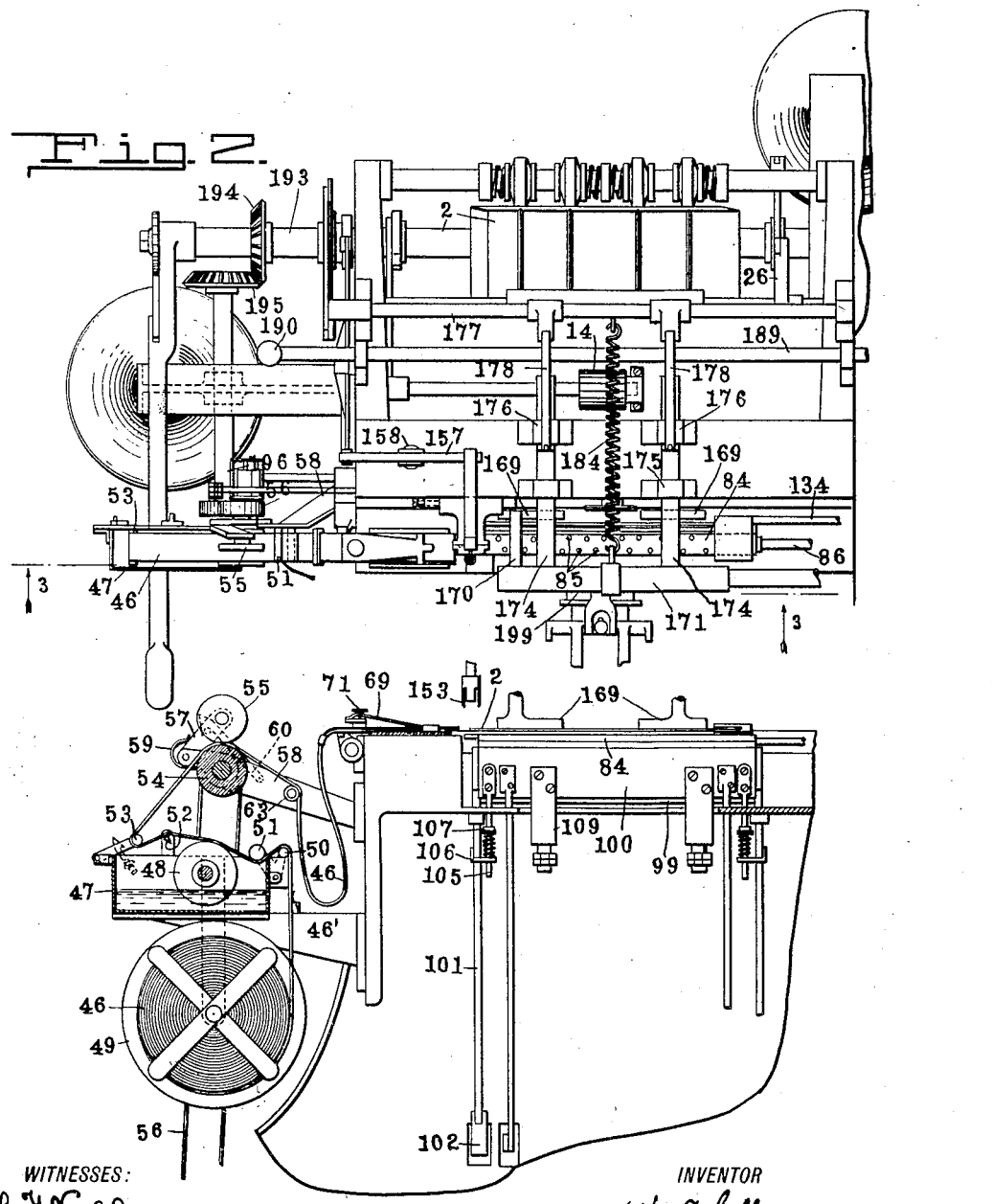

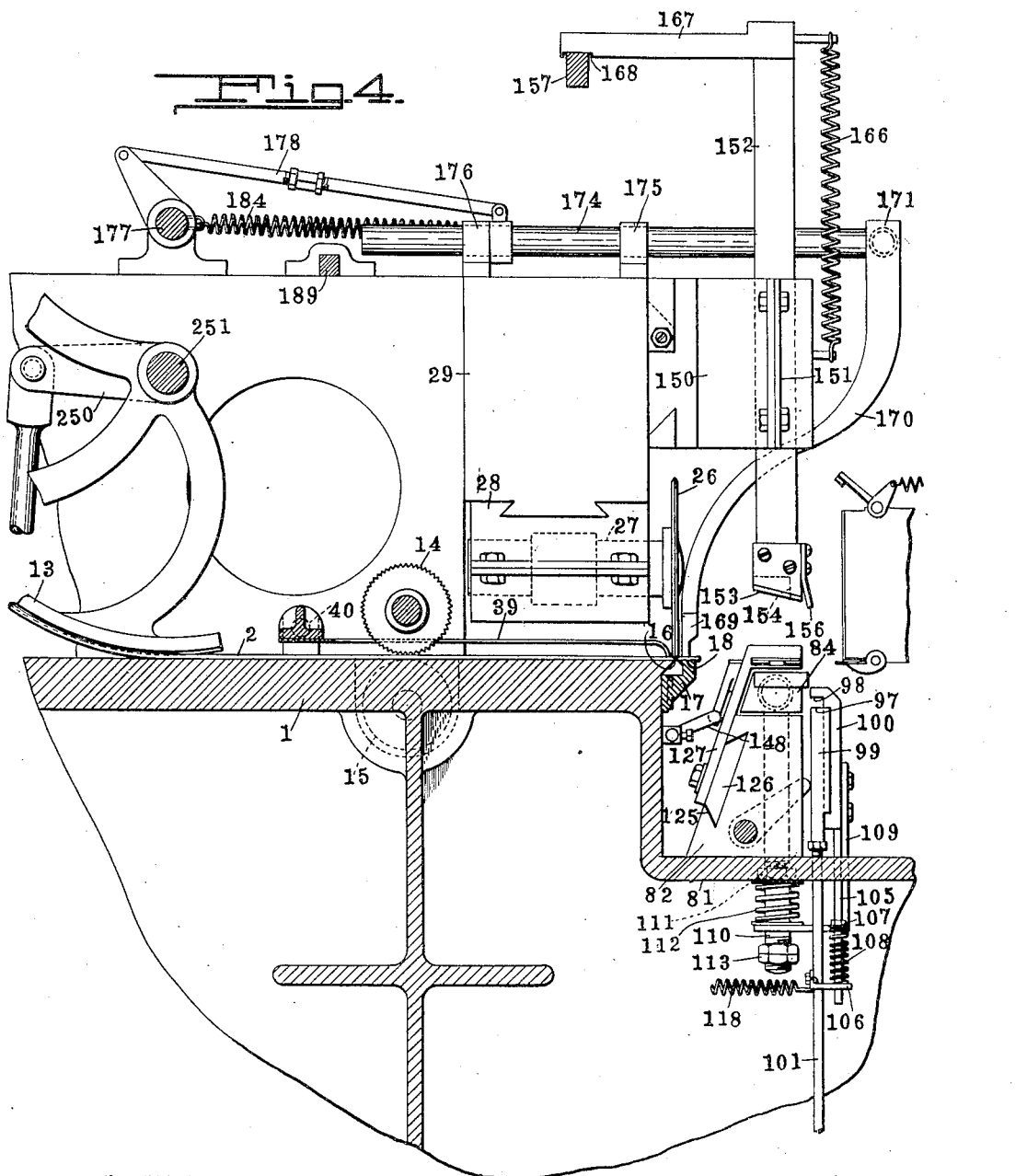

1,359,110.

Patented Nov. 16, 1920.
11 SHEETS—SHEET 4.

WITNESSES:
INVENTOR
W. Schelble
BY
ATTORNEYS

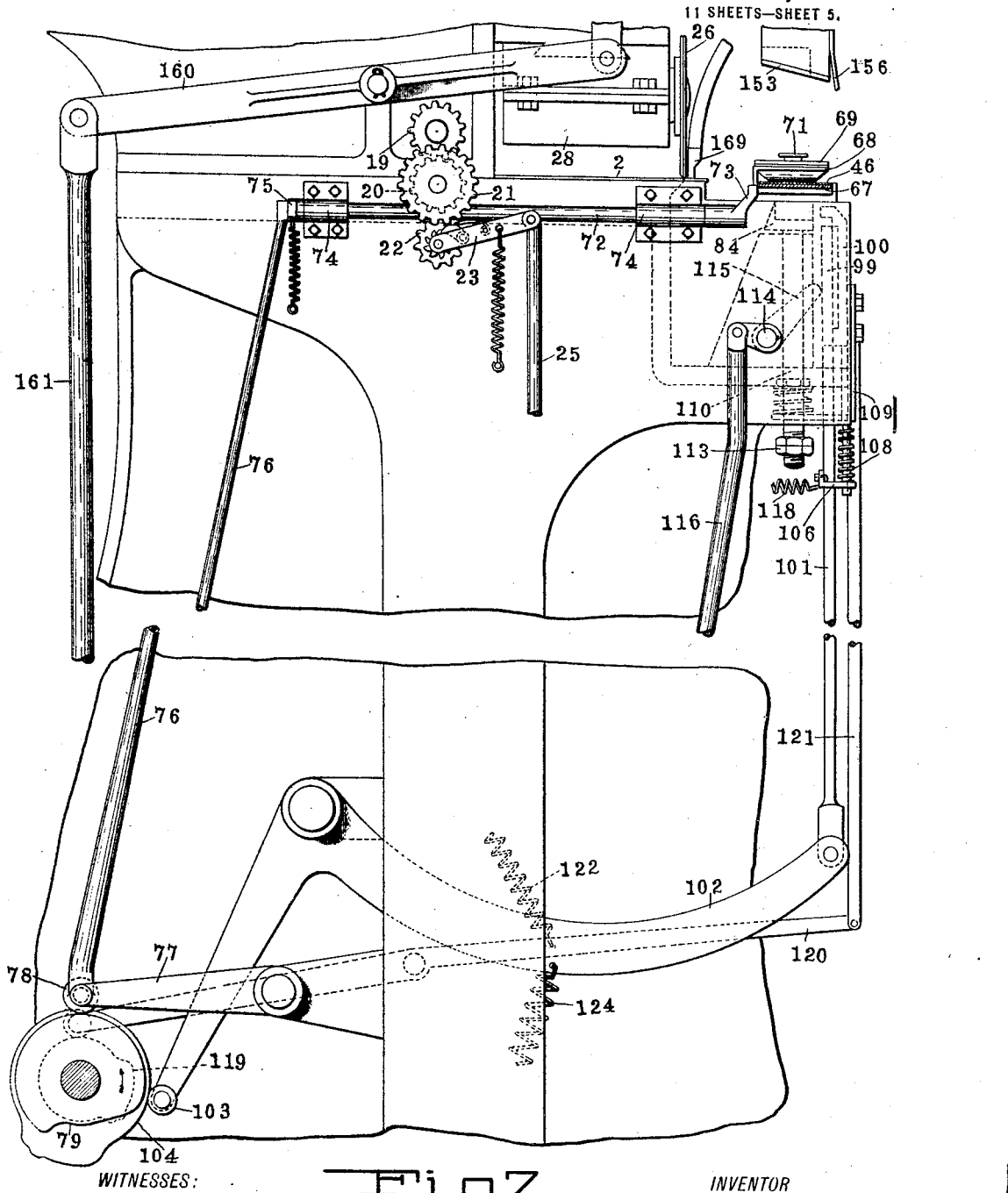

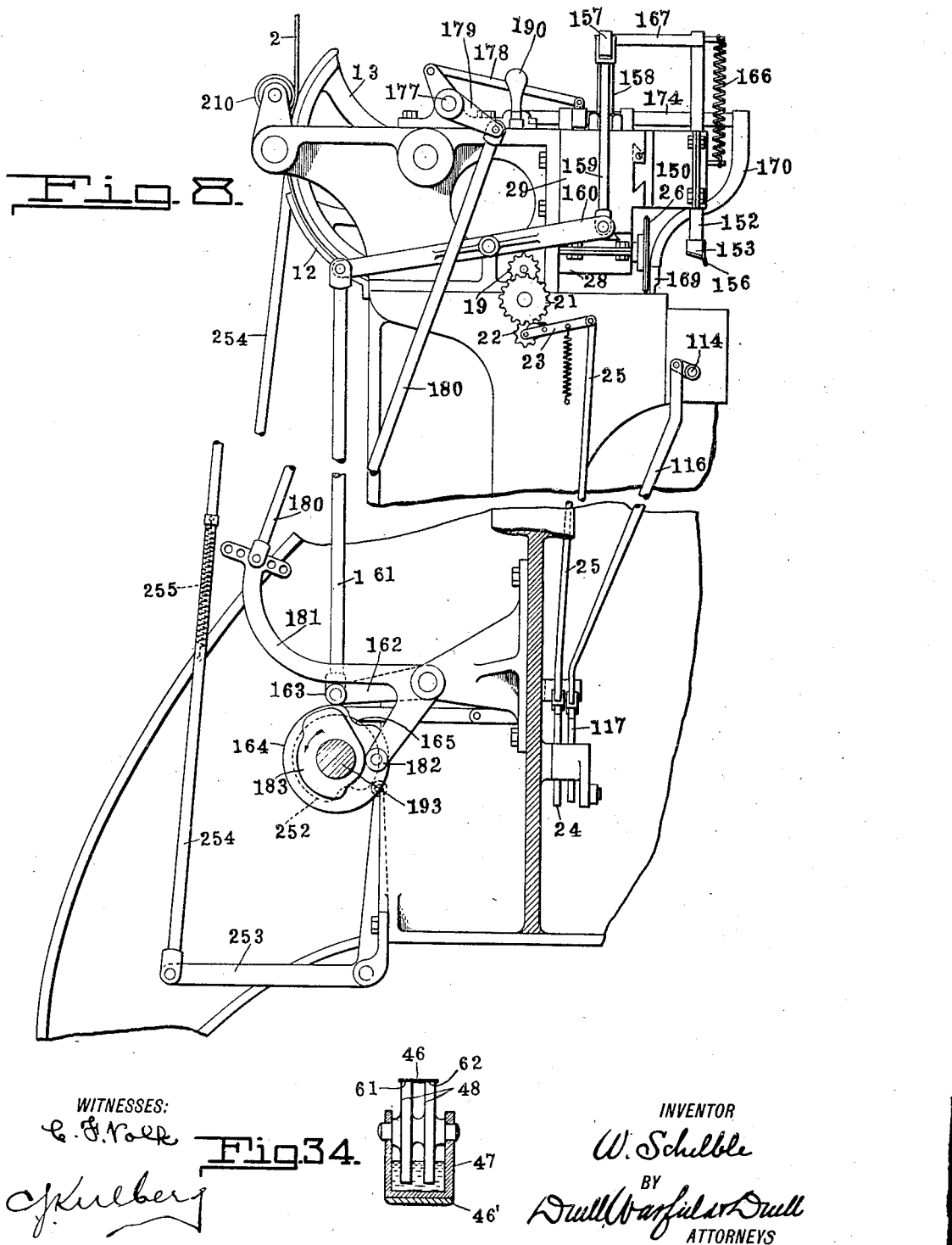

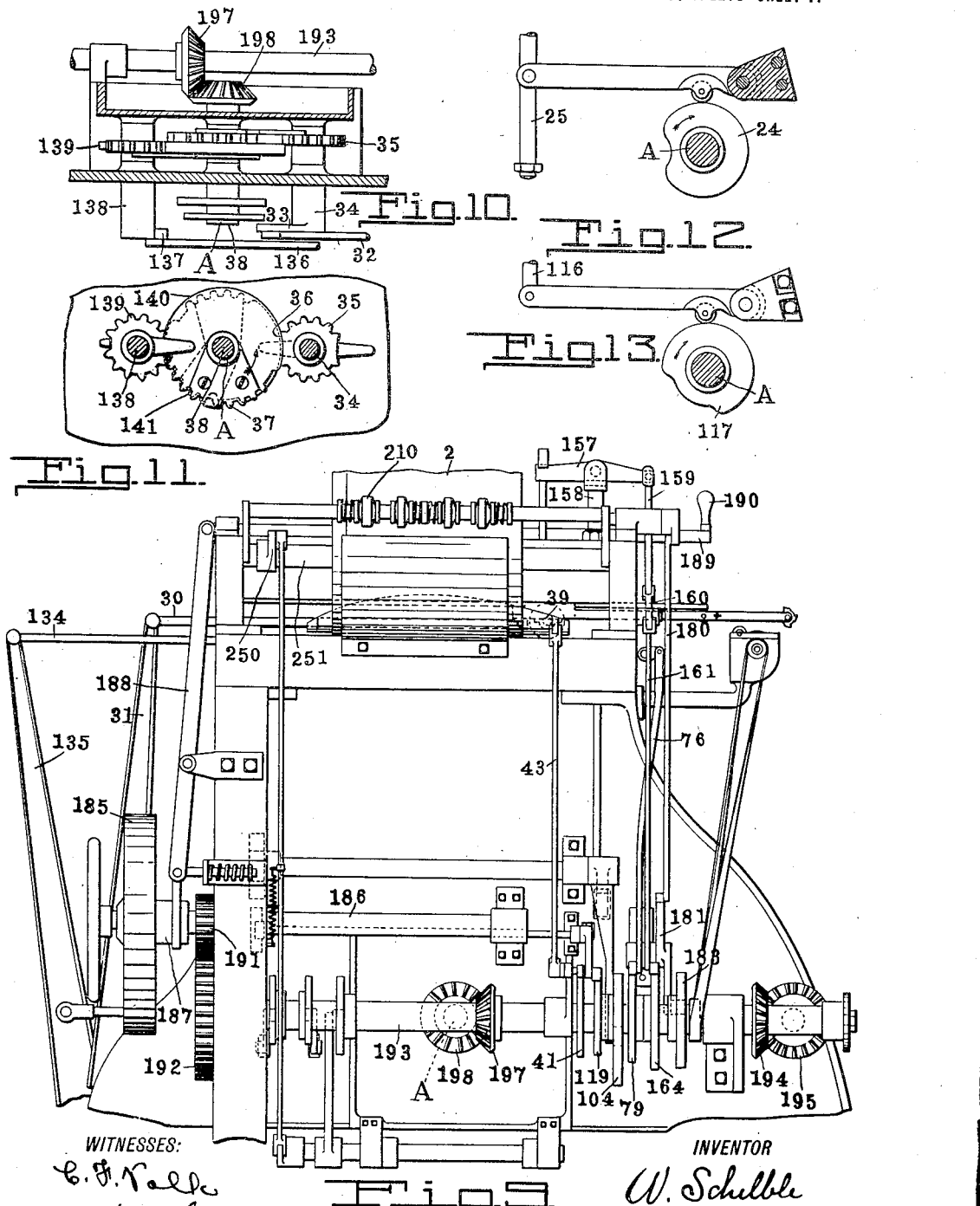

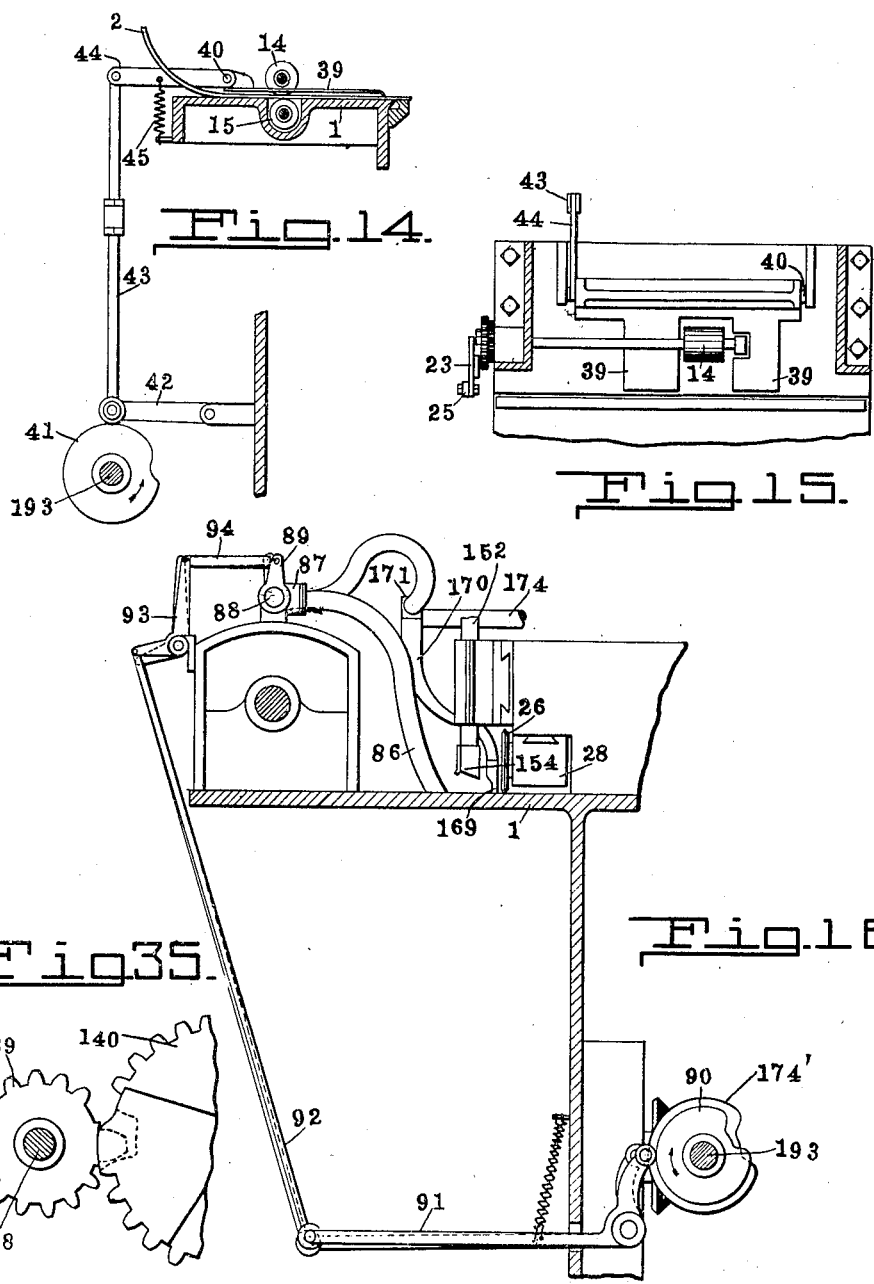

W. SCHELBLE.
MACHINE FOR MAKING BOXES.
APPLICATION FILED APR. 30, 1914. RENEWED APR. 19, 1919.
1,359,110.
Patented Nov. 16, 1920.
11 SHEETS—SHEET 9.
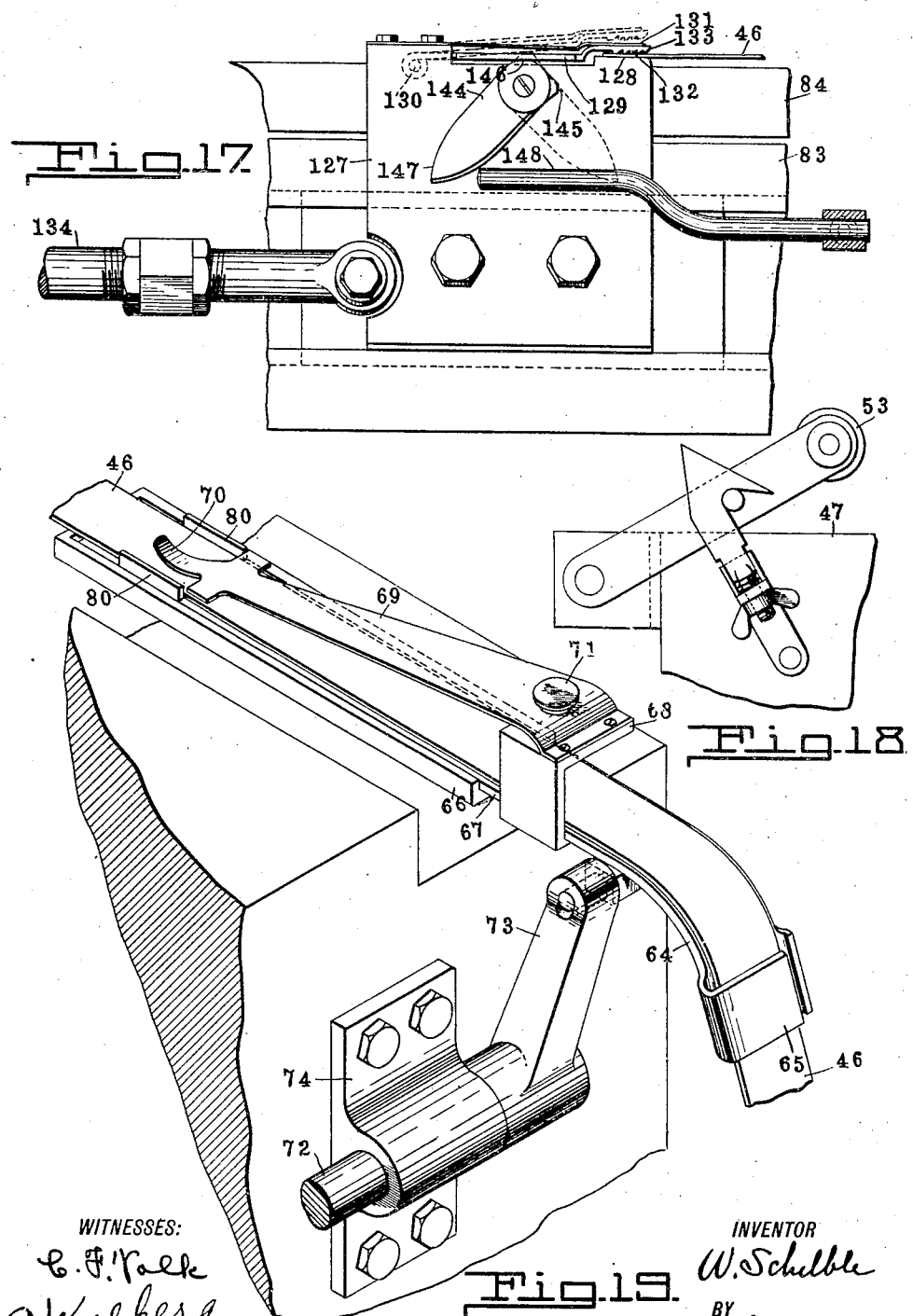

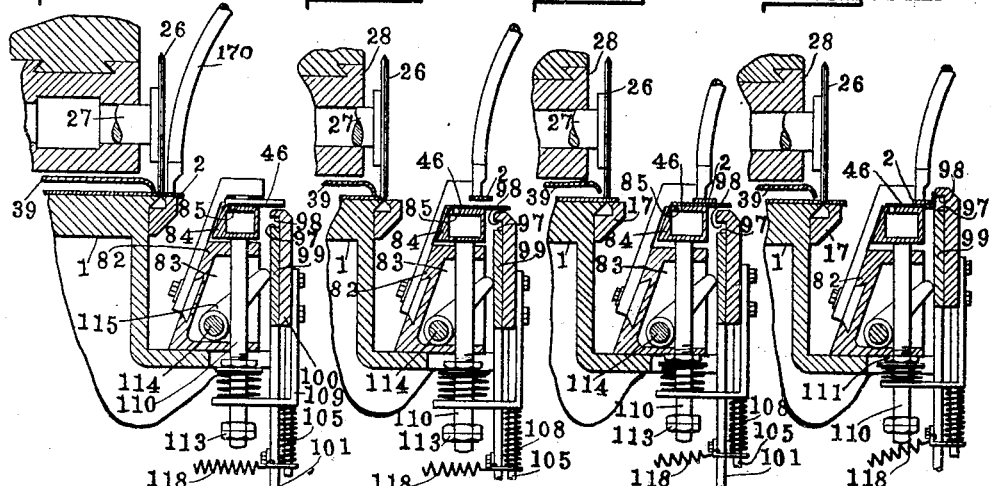

W. SCHELBLE.
MACHINE FOR MAKING BOXES.
APPLICATION FILED APR. 30, 1914. RENEWED APR. 19, 1919.
1,359,110.
Patented Nov. 16, 1920.
11 SHEETS—SHEET 11.
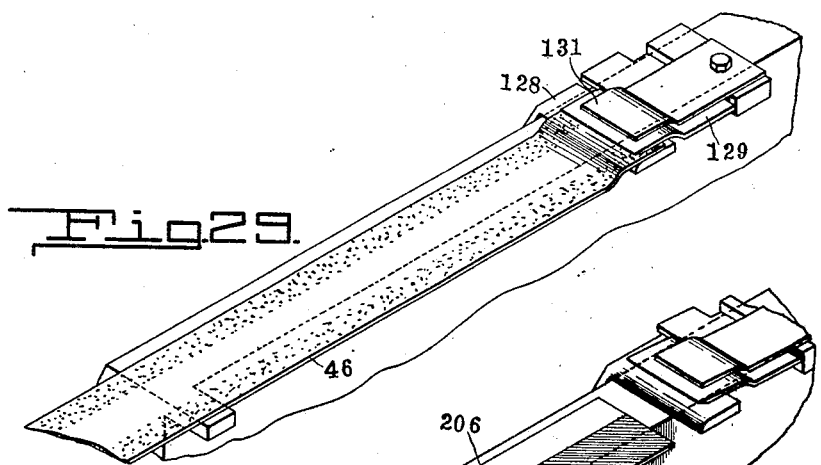
Fig.29.
Fig.30.
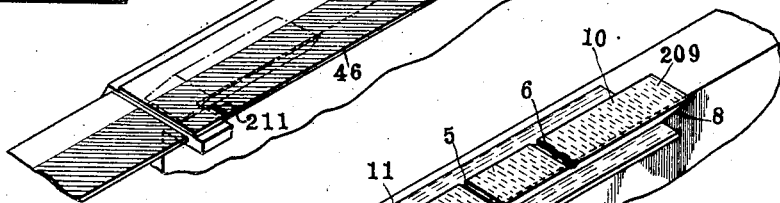
Fig.31.
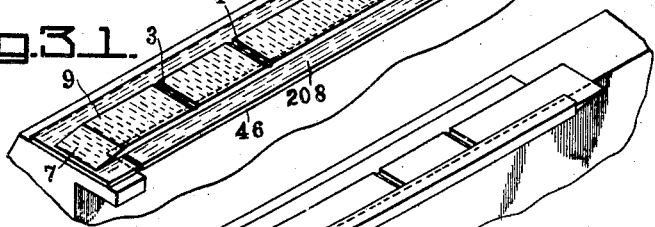
Fig.32.
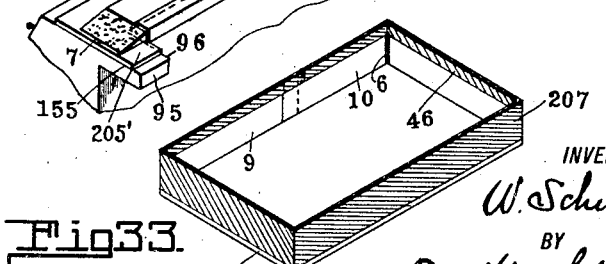
Fig.33.
WITNESSES:
INVENTOR
W. Schelble
BY
Drull, Warfield & Drull
ATTORNEYS

UNITED STATES PATENT OFFICE.

WILLIAM SCHELBLE, OF BUFFALO, NEW YORK, ASSIGNOR TO F. N. BURT COMPANY, LIMITED, OF BUFFALO, NEW YORK, A CORPORATION OF ONTARIO, CANADA.

MACHINE FOR MAKING BOXES.

1,359,110.  Specification of Letters Patent.  Patented Nov. 16, 1920.

Application filed April 30, 1914, Serial No. 835,396. Renewed April 19, 1919. Serial No. 291,416.

*To all whom it may concern:*

Be it known that I, WILLIAM SCHELBLE, a citizen of the United States, residing at 381 Box Ave., Buffalo, in the county of Erie and State of New York, have invented certain new and useful Improvements in Machines for Making Boxes, of which the following is a full, clear, and exact description, such as will enable others skilled in the art to which it appertains to make and use the same.

This invention relates to machines for making boxes, and with reference to its more specific features, to machines for making boxes or parts of boxes, from relatively stiff paper, such as cardboard, etc., and a covering of ornamental or finishing character.

One of the objects of the invention is the production of a practical machine for making a box or box element, which will retain its designed shape, and not readily warp.

Another object of the invention is the provision of a simple and efficient mechanism for making a box or box element from a plurality of strips or blanks, one of said strips serving as an ornamental covering and preferably embodying two or more colors.

Another object of the invention is the provision of an automatic mechanism of a relatively simple character for the production of a box or box element from continuous webs of material.

Still other objects will be in part obvious and in part pointed out hereinafter.

The invention accordingly consists in the features of construction, combinations of elements and arrangement of parts which will be exemplified in the construction hereinafter set forth, and the scope of the application of which will be indicated in the following claims.

In the accompanying drawings forming a part of this specification, and in which similar reference characters refer to similar parts throughout the several views, Figure 1 is a view in left side elevation of a machine embodying this invention, some parts being omitted, for clearness;

Fig. 2 is a plan view of a portion of said machine;

Fig. 3 is a longitudinal vertical section taken substantially in the plane indicated by the line 3—3 of Fig. 2;

Fig. 4 is a transverse vertical section of the machine illustrating a portion of the feed mechanism;

Fig. 7 is a more detailed view of certain actuating mechanism for the combined folding and pressing devices;

Fig. 8 is a view illustrating the slitting knife and actuating mechanism therefor;

Fig. 9 is a rear elevation of the machine;

Figs. 10 and 11 are respectively a plan and elevation of the actuating means for the body web cutter and the cover web feeding gripper jaw;

Figs. 12, 13, 14 and 15 are detailed views of actuating mechanism;

Fig. 16 illustrates suction valves and actuating mechanism therefor;

Fig. 17 is a view in detail of the gripper jaw carrier and slide;

Fig. 18 is a detail of an adjustable tension device employed in the machine;

Fig. 19 is a perspective view of a portion of the cover web feeding mechanism;

Figure 1:
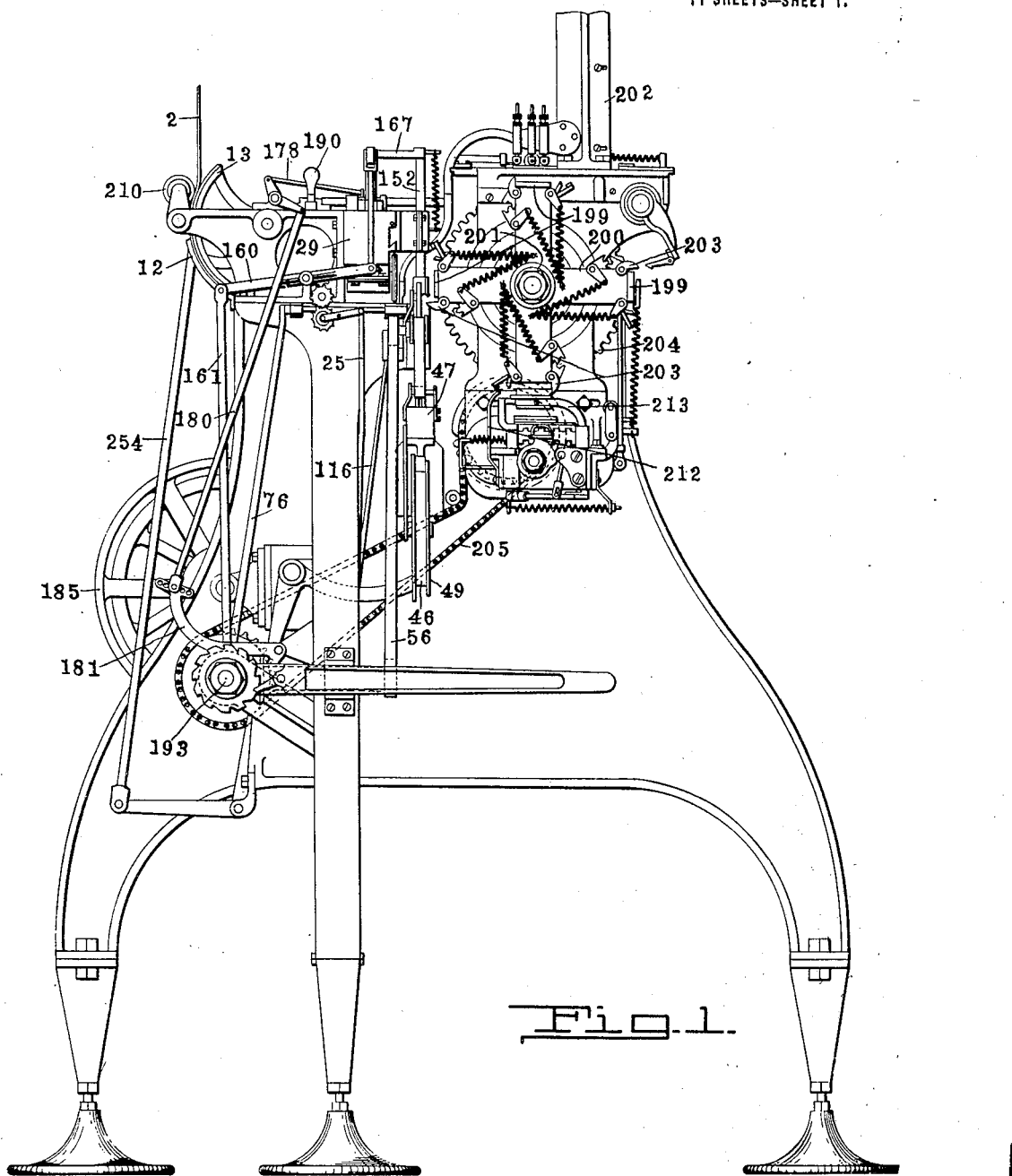
Figure 5:
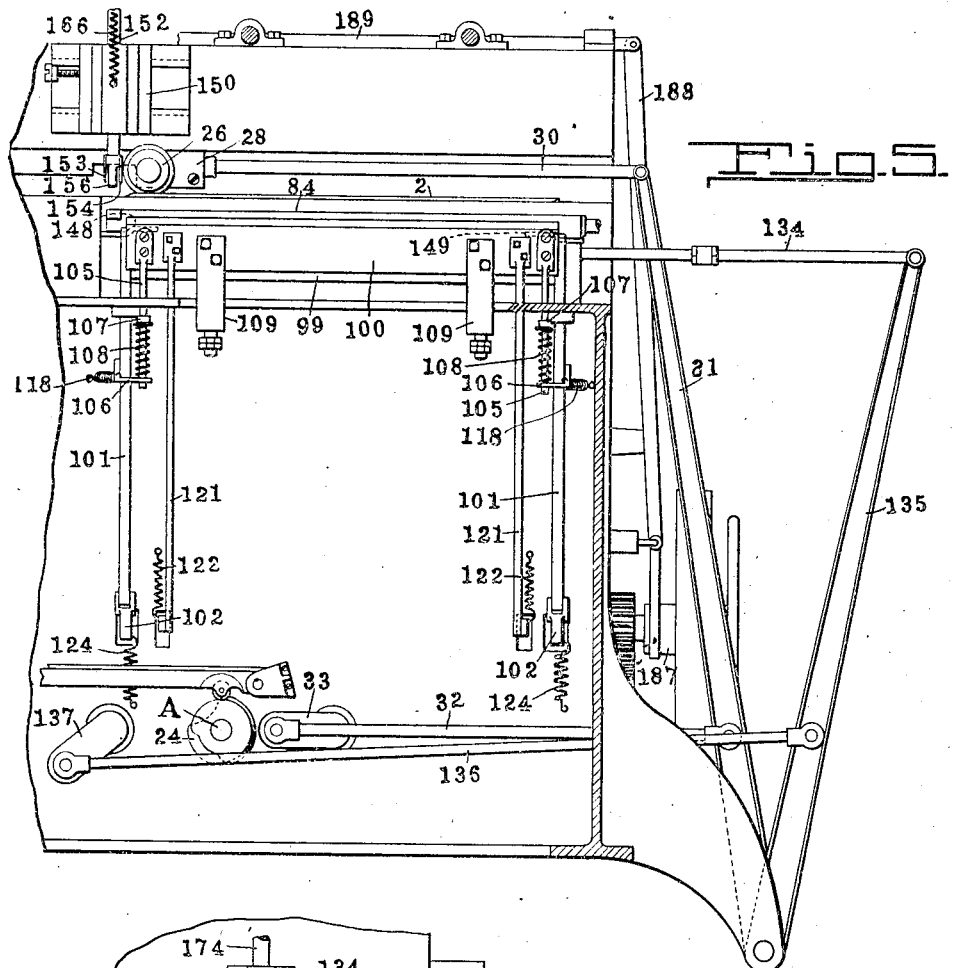
Fig. 5 is a view in front elevation with parts of the frame broken away to more clearly set forth the interior structure.

Figs. 20 to 28, inclusive, illustrate diagrammatically different positions of the machine parts in assembling the body blank and the cover blank;

Figs. 29 to 32, inclusive, are perspective views of the parts illustrating various stages of assembling the body and cover strips;

Fig. 33 is a perspective view of a box as produced by the machine;

Fig. 34 is an enlarged view, in section, of the cover web gluing roller; and

Fig. 35 is a detail of a portion of the mechanism shown in Fig. 11.

By this machine a box or box element is automatically produced from a plurality of webs of paper, or similar material, one of said webs being composed of relatively stiff and heavy paper, such as cardboard, and the other being relatively thin and flexible, sections of the latter web being readily adapted to fold or bend and form a conforming covering for sections or blanks severed from the heavy, or body, web. The preferred shape of the box or box element formed by the machine is prismatic, preferably rectangular, similar, as to shape, to the box and elements disclosed in the patent of Carlos Holly, No. 1,158,211, patented October 26, 1915. The present invention involves improvements over the machine disclosed in the patent above referred to, but in some particulars is similar thereto, and reference is accordingly made thereto for a fuller description of some of the devices herein mentioned. Like the machine of the former application, the present machine involves a main frame supported on standards and providing a horizontal table 1, over the surface of which is intermittently fed a body web 2 coming from a suitable source of supply. The body web is preferably longitudinally scored at different points or lines widthwise thereof, these lines corresponding to the lines which will become the corners of the box or box element to be produced. In the present case the body portion of the box flange is formed by sections of the body web (see Fig. 31), and the grooves 3, 4, 5 and 6 are provided therein by reason of the scoring above mentioned. The scores are formed by removing the material of the web, as by means of emery wheels having beveled or rounded edges, so that the grooves 3, 4, 5 and 6 are widest at the surface of the body sections, or blanks, and the surfaces incline therefrom toward each other, the depth of the grooves being such as to permit the sections to readily fold at the grooved portions, and present a sharp angular corner exteriorly of the folded element. The distance between the centers of grooves 3 and 4 and 5 and 6 is the same, and corresponds to one dimension of the box, and the distance between the centers of grooves 4 and 5 corresponds to the other dimension of the box. The body web 2 is also preferably beveled as by being scarfed, preferably on opposite faces, as at 7 and 8, the scarfing exposing the raw material of the body for the more ready "taking" of adhesive. One of the beveled faces is preferably sized, or provided with adhesive, as glue, before being operated upon by this machine, while the other beveled face is glued by the machine as the web passes over the table 1, all as described in the aforesaid patent, the gluing dauber for this purpose being carried by cutter carriage 28, hereinafter further described. The dimensions of the end divisions 9 and 10 of the body blank are such that when the blank is folded at the grooved portions 3, 4, 5 and 6, and the beveled surfaces 7 and 8 are superposed, the distance between the corners of the box measured along the side having the superposed beveled portions will be equal to the side comprised by the central blank division 11.

The body web, scored, scarfed and sized, as above mentioned, is introduced or comes into this machine between a curved plate 12 and guide fingers 13 (see Figs. 1 and 4), whence it passes across the table 1 between knurled feed rollers 14 and 15 and above a straight cutting edge 16 provided at the edge of the table, a bracket 17 providing a continuing portion of the table, as at 18. The guides 13 are sector-shaped, enter the grooves of the web and restrain lateral movement thereof. The rollers 14 and 15 yieldingly grip the body web at the central division between adjacent grooves, and are suitably geared together and operatively arranged to rotate at proper intervals and for a predetermined amount, to thereby feed the body web step by step relatively to the edge 16 a distance equal to the depth of flange desired for the box to be formed. In the present instance the movement of the feed rollers 14 and 15 is effected by intermeshing pinions 19 and 20 driven through a pinion 21 connected to the latter, and a gear 22, the latter in turn driven step by step by a pawl on lever arm 23 oscillated by a cam 24 through the instrumentality of a connecting rod 25 (Fig. 8). The guide fingers 13 move with the body or flange web, so that the friction between the web and said fingers need not be overcome by the feeding pull on the web, and when the web comes to rest the fingers are moved back to their original position, these movements being accomplished by an arm 250, on a cross shaft 251, to which latter the sector fingers 13 are fastened, the arm 250 being positively operated by cam 252, through the instrumentality of bell crank lever 253 and connecting rod 254, to cause the fingers to move in a direction opposite to that of the body web, forward movement of said fingers being effected by a spring 255 connected to rod 254 and to the frame of the machine.

The body web having been fed so as to dispose the proper amount thereof in advance of the cutting mechanism, as before stated, it comes to rest, and a blank or section is cut therefrom by a cutting disk which is moved across the web. The cutting disk is seen at 26 (Fig. 4) and comprises a rotatable disk mounted on an axle 27 journaled in a carriage 28 having dovetail sliding engagement with a substantial fixed cross piece 29 of the frame of the machine. This disk is moved back and forth across the web in coöperative relation with the edge 16, by means of a rod 30 suitably connected at one end to the carriage 28, and at its other end to a lever 31 fulcrumed on the main frame and operated through a second rod 32 and a crank arm 33 on a short shaft 34, the last journaled in the frame and provided with a pinion 35 having oppositely disposed locking faces 36 adapted to coöperate with teeth and a coöperative locking face of a gear 37 fast on a short shaft 38 journaled in the frame, the proportion of teeth on the respective pinion and gear being such that the disk 26 moves across the web in one direction during one rotation of shaft 38, and back during the following rotation, and is locked between its movements in opposite directions. The body web 2 is held in position to be severed by the knife 26 by clamping jaws 39 (Figs. 4, 14 and 15) projecting from a rock shaft 40 pivoted on the table 1, said jaws being positively pressed to hold this web against the table near the edge 16 by means of a cam 41 coöperating with a roller on rock arm 42 joined to shaft 40 by means of rod 43 and arm 44. A spring 45 serves to raise the jaws 39 when permitted by cam 41. A section having been severed from the body web 2, as above described, is ready to be assembled with a cover.

The numeral 46' represents a bracket at the side of the main frame below the table 1 and in general vertical alinement with the assembly point of the body and cover sections. On this bracket are supported the roll of cover web 46, and the gluing, guiding, tensioning and continuous feeding devices for the cover web. The devices for gluing the cover web may be of any efficient character, but preferably comprise a glue reservoir or tank 47, on which is rotatably mounted a glue-applying roller 48, so as to dip into the glue in the tank. A supply or roll of cover web of suitable width is carried by a rotatable reel 49, and is led over guiding and tensioning bars 50, 51 in a zigzag path, thence over roller 48, thence over a scraper bar 52, which removes superfluous glue, thence around a removable guide roller 53, and thence between a pair of rollers 54 and 55, the lower one of which latter rollers is positively driven by a belt or cord 56 from a convenient continuously driven shaft of the machine, and the upper one having a knurled periphery adapted to rest upon the cover web. Roller 55 is preferably carried by a rod 57 pivoted to a bracket 58 and is held against the web by gravity assisted, if desired, by a spring 59. A latch 60 serves to retain the roller 55 in position. The glue-applying roller 48 is so constructed as to leave an unglued space longitudinally of the strip of cover web. In its preferred form this roller provides two peripheral surfaces 61 and 62 (see Fig. 34), laterally spaced so as not to contact the web centrally, and of such width, respectively, as to leave a slight margin of unglued web at the edges of the web. The roller 55 is of a width to contact the central portion of the web without coming in contact with the adjacent glued portions. From the rollers 54 and 55 the cover web passes around a guide roller 63 and thence in a depending loop to a curved guide portion 64 of a web-positioning device having a keeper 65.

On the frame of the machine at one side of the path of the body web is a guideway 66 in which slides a plate 67 of which the curved guide portion 64 is a part. Supported by and overhanging the plate 67 is a bracket 68, on which latter is mounted a resilient arm 69 having a narrow finger 70, the latter being positioned so as to rest upon the unglued central portion of the cover web and clamp said web against plate 67 with sufficient pressure to cause the web to move with the plate 67, on movement thereof in one direction, and yet this pressure will permit the web to be drawn past plate 67 and finger 70, when the web is positively advanced by a separate feeding device, as will hereinafter appear. The amount of pressure between the plate 67 and finger 70 may be regulated by a screw 71. Sliding motion in opposite directions is communicated to plate 67 through a rock shaft 72 having an arm 73 pivotally connected to plate 67, said shaft 72 being mounted in bearing brackets 74 and having another arm 75 to which one end of a rod 76 is pivotally joined, the other end of said rod being pivotally connected to a rock arm 77. A roller 78 coöperates with a cam 79, properly contoured to give the requisite movements to the sliding plate 67, as will appear further on. The plate 67 is provided with flanges 80 to accurately guide the end portion of the cover web 46.

Figure 6:
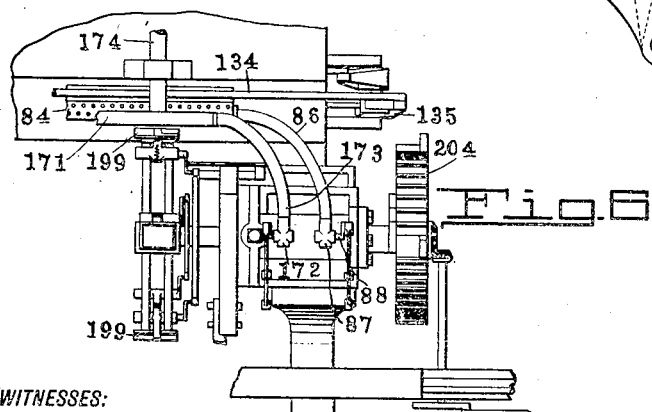
Fig. 6 is a top plan view of a portion of the machine showing the suction valves and appurtenances.

Fixed on a depressed portion of the main frame, as at 81, beneath the plane of the path of the body web and in the general vertical plane of the cover web is a transverse bracket 82 having a recess 83 (see Figs. 4 and 20). Above this bracket is situated a cover web support or carrier to receive and temporarily retain that portion of the cover web which is to be cut off and assembled with the sections of the body web before described. In the preferred embodiment, this cover web support, or carrier, comprises a hollow block 84 having a flat upper surface provided with openings 85 communicating with the chamber of the block. By means of a suitable flexible tube 86 (Figs. 6 and 16), the chamber of the block communicates with a valve chamber 87 containing a valve having a stem 88 projecting outside the valve chamber, the stem having an arm 89 adapted to be operated to open and close the valve by a cam 90 through the instrumentality of rock lever 91, connecting rod 92, bell crank lever 93 and link 94. Said valve controls communication between the pipe 86 and an air exhausting device, as a vacuum pump placed at a convenient place on or near the machine. The block 84, at its end adjacent the sliding plate 67, has a forwardly projecting lug 95, the upper face of which is flush with the top of the block, and the inner edge 96 of which is adapted to serve as a fixed blade to cooperate in providing a slit in the forward edge of the section of the cover web 46 (see Figs. 30 and 32).

Disposed to operate in a plane across or normal to that of the cover web sections are folding and pressing devices comprising a lower pressing jaw 97, and an upper combined folding and pressing jaw 98, the jaw 97 being the upper face of a plate 99 extending crosswise the machine and the jaw 98 comprising a rearwardly projecting portion or flange of a plate 100, also extending transversely of the machine. Movement of these folding and pressing devices across the plane of the web is accomplished by rods 101 fixed to the plate 99 at their upper ends, and pivoted to bell crank levers 102 having rollers 103 in the path of cams 104. The plate 100 is supported on rods 101 by means of depending stems 105 fixed at one of their ends to the plate 100 and extending through openings in brackets 106 fastened to rods 101. The stems 105 are provided with adjustable shoulders 107, and between said shoulders and the brackets 106 are springs 108. Brackets 109 are fixed to the plate 100, and supporting stems 110 depending from the hollow block 84 pass loosely through slots in the horizontal arms of brackets 109 and through openings in the bracket 82. Nuts 111 provide adjustable shoulders on stems 110, and springs 112 are interposed between shoulders 111 and the brackets 109. Below brackets 109 the stems 110 have stops provided by nuts 113. The folding devices not only move across the path of the web sections, but also longitudinally thereof in order to complete the fold of a portion of one section around the edge of the other, as will be explained further on, and in order to accomplish this longitudinal movement, a rock shaft 114 is disposed in the recess 83 in the bracket 82, and has arms 115 which bear against the inner face of plate 99 and have a cam action at proper times to press the folding devices forwardly and permit them to move rearwardly, on which latter movement portions of the web sections will come between the jaw 97 and the jaw 98. Motion is given the rock shaft 114 at proper times and for proper amounts by a rod 116 through the instrumentality of a cam 117, the cam operating to positively move the folding devices forwardly, and springs 118 serving to move them in the opposite direction. The stops 111 are designed to contact the under face of bracket 82 to determine the extreme upper position of the block 84. After the folding of one section around another, the upper jaw 98 is moved toward the lower jaw to effect a squeezing of the fold between these jaws, this movement of the upper jaw being accomplished by cams 119 coöperating with one arm of rock levers 120, the other arm of said levers being pivotally connected to the upper jaw by rods 121, springs 122 being employed to keep the levers 120 in contact with the cams 119. A spring 124 performs a similar function for bell crank 102.

In order to feed the cover web onto the upper surface of the hollow block 84 preparatory to severing a section therefrom a reciprocatory feeder comprising gripper jaws is provided (see Figs. 4 and 17). A dovetail groove 125 is provided in an inclined inner face of the bracket 82, this groove providing a horizontal guideway transverse of the machine, in which slides a carriage having the gripper jaws mounted thereon. This carriage may comprise a plate 126 conforming to the transverse shape of said guideway and an upwardly extending arm 127 fastened to plate 126, the upper end of said arm being disposed to move in a plane directly over the block 84 and providing a lower gripper jaw 128. On the member 127 is an upper gripper jaw comprising a plate 129 pivoted to member 127 at 130, a flat spring 131 being disposed to press the upper jaw toward the lower jaw. The upper jaw preferably has a longitudinal series of teeth 132 depending from the central portion thereof, the foremost tooth curving into the upper face of the upper gripper, as at 133. The numeral 134 indicates a connecting rod, one end of which is pivotally joined to plate 127, the other end being pivoted to a rock lever 135, in turn connected by rod 136 to a crank arm 137 on a short shaft 138, which latter carries a pinion 139 having a series of teeth interrupted by a locking face. Pinion 139 meshes with two alternate series of teeth 140 and 141 and locking faces 142 and 143 on shaft 38, and the number, proportion and arrangement of the teeth and locking face of the pinion 139, and the coöperative teeth and locking faces on shaft 38 are such that the gripper carriage is advanced to bring its grippers adjacent the end of the cover web at one side of the machine, rests a short while, and then returns to its original position on the oposite side of the machine, where it again rests before again advancing to feed the cover web.

In the operation of the machine the gripper jaws 128 and 129 move from one side of the machine toward the other and come to rest with the jaws 128 and 129 disposed, respectively, above and below the end of the cover strip 46. These jaws are in open position while advancing to grasp the cover strip and as the gripper carriage comes to rest the jaws are closed by a pawl lever 144 pivoted on the arm 127 and having a high portion 145 and a low portion 146 forming a cam surface on one arm of lever 144. The other arm 147 of this pawl lever is disposed in alinement with pawl operating dogs, comprising pins 148 and 149 disposed adjacent the opposite ends of the path of movement of the pawl 144. As shown in Fig. 17, the jaws have been advanced to position to grip the end of the cover strip, and when advancing to this position the pawl 144 is in the position shown in the dotted lines, in which case the high portion 145 of the cam surface will hold the upper jaw 129 spaced from the lower jaw. Just before the gripper carriage comes to rest the pawl will contact the pin 148, and continued advance will cause the pawl to turn in a direction to bring the low portion of the cam surface directly beneath the gripper jaw 129, and when the carriage comes to rest the jaws 128 and 129 will have closed upon the cover strip 46. Movement of the carriage in the opposite direction will pull the cover strip across the block 84, and at this time the valve hereinbefore mentioned will cut off the suction from the chamber of the block. When the carriage arrives at the opposite side of the machine, the pawl 144 will be turned by the dog 149 to open the jaws 128, 129 when a sufficient amount of the cover web 46 has been pulled or fed, and then the carriage will move farther to remove the gripper jaws from the end of this web. The gripper carriage then remains at rest while the cover strip is severed, assembled with a body section, and removed from block 84, whereupon the jaws advance to repeat the web-feeding operation just described. Just before the gripper jaws release the cover web 46 the suction takes effect on the web by the opening of the valve referred to and the web will be held on the block 84 by suction. A proper length is then severed from the cover web, and a slit is formed in the front edge of the section, as will now appear.

On the front face of the cross piece 29 is adjustably fixed a bracket 150 comprising a removable front portion 151. Mounted to reciprocate in this bracket as a guideway is a squared rod 152 having affixed at one side thereof and projecting below its lower end a severing cutting blade 153, and at the other side thereof and similarly projecting a slitting blade 154. As the rod 152 descends the blade 153 coöperates with the outer edge 155 of the block 84 and lug 95, to sever the cover web, and the blade 154 coöperates with the edge 96 of said lug to slit the web at its front edge, the severing and slitting taking place practically simultaneously. In order to assure the severing and slitting at the proper points the cutting edges of the blades 153 and 154 are in line with the inner faces of guides 156, spaced apart just the width of the lug 95. In this manner the cover web section is provided with a slit extending rearwardly from its front edge, and the portions at opposite sides of the slit may be folded independently. In order to effect the reciprocatory movement of the severing and slitting blades, a rock lever 157, fulcrumed on a standard 158, is connected by a link 159 to one arm of a lever 160, the opposite arm of which is joined by a rod 161 to a rock arm 162, and has a roller 163 coöperating with a rotary disk 164 having a concentric peripheral surface interrupted by a cam or depressed portion 165, into which the roller 163 descends and thereby permits the momentary descent of the scoring and slitting blades 153 and 154, under the influence of the spring 166, these blades being positively raised as said roller moves out of the cam portion 165. The rod 152 has a rearwardly extending arm 167, against the lower face of which the lever 157 plays, and in a recess 168 in said face. One end of spring 166 is attached to rod 152 and the other end to bracket 150.

The respective severed sections of the body web and the cover web are to be assembled, folded into a flange, and associated with a head to form a complete box, although it will be apparent that, viewed in some aspects, the invention contemplates the formation of a flat assembled composite blank, or a folded element which may serve as a collar for a box. In the present embodiment the mechanism for assembling a body section with a cover section comprises a transfer device which pneumatically grips the severed body section and advances it to be adhesively assembled with the cover section. Numerals 169, 169 represent two hollow members extending transversely of the machine, the lower faces of these members each being plentifully perforated to communicate with the inner chamber at a plurality of points. Thus, when the air is partially or wholly exhausted from the inner chambers of the members 169, the lower faces thereof operate as pneumatic grippers. The more important function of these members is to control the position of the section of the body web after it has been severed by the knife 26, and to dispose this section in proper position relative to the cover section. In the present embodiment the body section, after having been severed, is advanced in a horizontal plane to such a position above the cover section lying on block 84, that the rise of said block, as before described, will cause these sections to be superposed, the body section on the adhesive face of the cover section, and in such relative position as to place the front edge of the body section parallel to the front edge of the cover section on a line distant from the front edge of the cover section corresponding approximately to the distance of the inner end of the slit in the cover web from said edge. Also in the present embodiment, the rear or trailing edge of the cover section will be in rear of the similar edge of the body section and parallel thereto so as to serve as a binder to secure the flange to a box head, although it will be evident that the rear edges may be flush, if desired, as when a collar is to be formed. The sections having been superposed, and the end of the cover section folded onto the body section, a further advance of the grippers 169 will place the assembled sections in the path of the mechanism which assembles heads with said sections and folds and secures the sections thereto, thus forming boxes. To accomplish the foregoing functions, and others appurtenant, the transferring grippers 169, 169 are each supported by hollow arms 170, 170 from a hollow head 171. The chambers of the members 169, 169 communicate with the interior of the head 171 through the arms 170, 170, and the air may be exhausted from said head through a valve in a valve chamber 172, a flexible pipe 173 connecting the head and the chamber 172, the valve in the latter being controlled by a stem through the instrumentality of a cam 174', and operative connections similar to the control of the valve in chamber 87. Thus at proper times the air pump or vacuum device may be connected or disconnected from the grippers 169, 169. The head 171 is supported by parallel rods 174 slidably guided in pairs of brackets 175 and 176 on the top of cross piece 29. Numeral 177 indicates a transverse rock shaft connected to rods 174, 174 by links 178, 178, and motion is given to the rock shaft to advance and retract the grippers 169, 169 by means of an arm 179 on shaft 177, joined by connecting rod 180 to an arm 181 of a bell crank lever, the other arm of this lever having a roller 182 coöperating with a cam 183, the latter suitably contoured to give the requisite movements to grippers 169, 169. The cam 183 positively moves the grippers 169, 169 forwardly, their rearward movements being effected by a spring 184, which latter is preferably connected to a fixed pin or hook on the shaft 177 and to head 171, so as to take up any slack in the operative connections intermediate the head 171 and the cam 183.

The machine is set in motion by means of a belt pulley 185 which may be continuously driven from any suitable motive source, and which is adapted to be connected and disconnected from a main driving-shaft 186 by any suitable form of clutch 187, (indicated diagrammatically only) the latter adapted to be thrown into and out of position to couple and uncouple the pulley 185 to the shaft 186 by means of a lever 188 and a shift-rod 189 having a handle 190. On the main driving-shaft is a small gear 191 meshing with a larger gear 192 on a horizontal countershaft 193 journaled on the main frame at the lower rear portion thereof, and by means of bevel gears 194 and 195 motion is communicated to a longitudinal shaft 196 which drives the belt 56 for the purpose of giving continuous rotary motion to one of the cover web supplying rollers 54. The countershaft 193 is also provided at an intermediate portion with a bevel gear 197 engaging a similar gear 198 on a shaft 38, which latter operates to drive the body web cutter and the cover web feeding gripper jaws, as hereinbefore described. Also on the shaft 193 are mounted many of the cams which operate to give the special motions to the different parts of the machine, as hereinbefore set forth.

After the body and cover web sections have been adhesively assembled and interfolded as before described, the composite blank so formed will be advanced by the grippers 169, 169 into the path of a series of formers or mandrels 199, these formers moving in an endless path and being supported at the ends of arms 200 projecting from a rotatable hub 201. The mandrels are driven intermittently and at their positions of rest one of them will be in position to receive or will have received a box head from a head magazine 202, said head being fed to the mandrels 199 as explained in the patent hereinbefore referred to. Referring to Fig. 1, the mandrel 199 at the left-hand side in its position of rest will have received the central division of the composite blank hereinbefore referred to, the ends of the blank projecting laterally at each side of the mandrel, the pneumatic grippers supporting said composite blank adjacent or against the mandrel. Before these pneumatic grippers are deënergized or release the composite blank, a jaw 203 moves into position to clamp said blank against the mandrel. The pneumatic grippers then release the blank and further operations on the blank are accomplished by the former and its associated folding devices, which fold the blank transversely around the side of the mandrel and also around a box head which has been previously delivered to the front face of the mandrel and is held thereon by suction. After the composite blank has been released by the pneumatic grippers, and clamped to the mandrel 199, adjacent the edge of the box head held on said mandrels, the composite blank is folded around the edge of the box head, the beveled portions of the body blank are superposed and pressed together, and the projecting tongue 205' of the cover blank is folded over the edge of the body blank opposite the joint at the superposed portions, in the manner and by the mechanism similar to that disclosed in an application of C. Holly, filed January 16, 1911, Serial No. 602,862, some of the mechanism of the just mentioned application being shown in the drawings attached hereto for the sake of clearness. The hub 201 is driven through the instrumentality of a mutilated gear 204, which is driven from shaft 193, by a chain 205, and other operative connections preferably as set forth in said prior application.

The box flange produced by the machine herein described preferably exhibits different colors exteriorly, one of the colors appearing as a narrow strip of color around the flange adjacent the head of the box as indicated at 206, the cover web being colored appropriately to provide this strip at the place referred to. The cover web may be colored in any approved manner to provide the different colors on the flange of the box, and in the present embodiment two colors are employed transversely of the cover web, the one appearing at 206 (see Fig. 30) and the other appearing at 207, the line of intersection of the colors being a line longitudinal of the web and at an intermediate transverse portion thereof. A simple way of producing the multi-colored web is by overlapping webs of the desired colors and gluing them together at the overlapped portions. The resultant web is mounted upon the reel 49 for delivery to the machine.

Furthermore, both the body web and the cover web are fed to the machine so that the severed sections thereof when in superposed assembled relation, as shown for instance in Fig. 31, will have the grain of the cover section arranged across or at an angle to the grain of the body section, as shown in Fig. 31, wherein the broken lines 208 represent the grain of the cover section and the broken lines 209 the grain of the body section. The cover web accordingly resists stretching to a greater degree longitudinally than transversely, and it is found that the flange so resulting substantially preserves when assembled into a box the plain flat surface so desirable in a prismatic box, and that the walls of the box do not curve or warp out of shape to the extent observed in boxes of different construction.

The operation of the machine should be obvious from the foregoing description, but a brief summary thereof will be given. A narrow web 46 preferably of a width sufficient to cover the length of the body section and extend beyond both the forward and rear edges of the body section, is supported upon the reel 49, is passed between the guiding and tension rollers 50 and 51, thence into contact with a glue-applying roller 48, thence around a guide bar 53 and between rollers 54 and 56 whence it depends in a loop, its end being passed into the keeper 65 and into position to be yieldingly gripped between the finger 70 and the plate 67. It will be understood that the grain of the web 46 extends longitudinally of said web. A body web 2 of such a weight and relative stiffness as to form a substantial body section is grooved, beveled, and one edge sized, as hereinbefore described, and the end of such a web is led to the machine at an angle to the direction of feed of the cover web, passing between the fingers 13 and yielding presser rollers 210 and between said fingers and the guiding plate 12 onto the table 1, its end being also passed between the feed rollers 14 and 15 into position to be operated upon by the cutter 26. It will be understood that the grain of this web extends longitudinally of the web. The machine may now be turned over once or twice, whereupon the cutter 26 will operate to provide a straight front edge for the body web. Continuous operation of the machine may then be started by operating the clutch 187. The plate 67 will be advanced to project the end of the cover web transversely of the machine in the vertical plane of the block 84, the carriage 127 will pass across the machine and the end of the cover web will be received between the grippers 128 and 129 and gripped thereby, the teeth 132 taking hold of the cover web at the portion free of the glue or other adhesive. During these operations the cutter 26 will pass across the machine in one direction and sever a body section from the web 2 in rear of the advancing end of said web. The carriage 127 will then move in the reverse direction across the machine and pull or feed the cover web onto the block or pneumatic gripper 84, and when a length of cover strip sufficient to cover a flange of a box peripherally, and overlap, has been fed, the grippers are released by the pawl 149, but just before the cover web is so released, suction becomes effective in the chamber of the block 84 to energize this gripper, so that when the cover web is free from the grippers it will be held on the block 84 by the suction. The carriage 127 rests momentarily while the cover section is assembled with the body section and removed from the block 84 toward the device designed to further operate thereon. While the cover section is being positioned as just described, a body section will have been cut off from the web 2, and as soon as this section is severed it will be automatically gripped to the grippers 169 on account of the reduced pressure therein at that time. The grippers 169 then move forwardly in a right line and into position above the cover section held on the block 84, as shown in Fig. 21, the front and rear edges of the body section being positioned within the front and rear edges of the cover section. The block 84 then rises, and the sections referred to are superposed one upon the other, a plurality of colors of the cover section intercepting the length of the body section, the adhesive or glue being therebetween, as shown in Fig. 22. Thereupon the folding and pressing jaws 97 and 98 rise and fold the longitudinal edge of the cover section across the transverse edge of the body section, as illustrated in Fig. 23, and thereafter said jaws move rearwardly so as to fold the edge of the cover section into position above the body section, as illustrated in Fig. 24. The jaw 97 then remains at rest while the jaw 98 moves down, and the interfolded elements are squeezed so as to become firmly secured together as illustrated in Fig. 25. Thereupon the jaws 97 and 98 are released from their squeezing position and moved forwardly beyond the edge of the assembled sections and thereafter moved downwardly into their original position, as illustrated in Figs. 26 and 27. During the several operations above mentioned, the grippers 169 retain their hold upon the body section. After the jaws 97 and 98 have returned to position below the plane of the assembled sections, the grippers 169 move forwardly and place the composite blank thus produced in the path of one of the formers 199, the two grippers 169 passing one on either side of the path of the former and supporting the composite blank so that the advancing wall of the former moves into position against or closely adjacent that division of the composite section corresponding to the division 11 of the body section. The grippers retain the blank in this position until the jaw 203 shall have been moved to clamp the composite section against the former, whereupon the suction is cut off from the grippers 169 which then return to position closely adjacent the body web to receive another section cut off from the end of the body web. Before the body section and the cover section are assembled as described, and after the cover section has been disposed upon the table 84, the severing knife 153 and the slitting knife 154 descend, the one severing a cover section from the end of the cover web in rear of the advancing end of said cover web, and the other simultaneously slitting the cover section transversely thereof, providing the slit 21 shown in Fig. 30. In said figure the dimension of the slit is exaggerated for the sake of clearness, it being understood that the slitter 154 is sharp and makes a clean cut having no substantial width at this point.

The composite blank gripped between one face of the former 199 and the jaw 203 will extend laterally at either side of said former. The former then moves past a folding horn 212, which partially folds the extended portions of the composite blank toward the lateral walls of the former, said folding being completed by folding jaws 213 disposed at a lower position of rest of said former. The assembly of the composite blank with the head need not be herein further described, as the mechanism for accomplishing the assembling is preferably the same as that disclosed in the prior applications before mentioned. Thus by the above described apparatus are accomplished, among others, the objects hereinbefore referred to.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein disclosed, and all statements of the scope of the invention which, as a matter of language, might be said to fall therebetween.

Having described my invention, what I claim as new and desire to secure by Letters Patent is:

1. In an apparatus of the character described, in combination, a plurality of sources of web supply, means adapted to feed webs from said sources, means adapted to sever sections from said webs and superpose the severed sections, means adapted to slit one of said sections in its longitudinal edge opposite the other section, and means adapted to fold the longitudinal edge at one side of said slit around the adjacent edge of the other section and adhesively secure the folded portion to said other section.

2. In an apparatus of the character described, in combination, a plurality of sources of web supply, means adapted to feed webs from said sources, means adapted to sever sections from said webs and superpose the severed sections, means adapted to slit one of said sections in its longitudinal edge opposite the other section, means adapted to fold the longitudinal edge at one side of said slit around the adjacent edge of the other section and adhesively secure the folded portion to said other section, and means adapted to move the resultant blank away from the position in which said folding was effected.

3. In an apparatus of the character described, in combination, a plurality of sources of web supply, means adapted to feed webs from said sources, one of said webs comprising different colors transversely thereof, means adapted to sever said webs in rear of their advance ends, thereby producing sections, means adapted to superpose said sections so that the grain of one extends crosswise of the grain of the other and a plurality of said colors of one section intercepts the length of the other section, means adapted to slit said color section in its longitudinal edge opposite the other section, and means adapted to fold the longitudinal edge at one side of said slit around the adjacent edge of the other section and adhesively secure the folded portion to the other section.

4. In an apparatus of the character described, in combination, a plurality of sources of web supply, means adapted to feed webs from said sources, means adapted to sever sections from said webs, and mechanism adapted to adhesively assemble said sections in superposed relation comprising a plurality of supports, one for each section, and means adapted to cause relative movement between said supports to cause superposition of said sections.

5. In an apparatus of the character described, in combination, a plurality of sources of web supply, means adapted to feed webs from said sources, means adapted to sever sections from said webs, and mechanism adapted to adhesively assemble said sections in superposed relation comprising a plurality of supports, one for each section, means adapted to cause relative movement between said supports to cause superposition of said sections, one of said supports comprising a pneumatic gripper and means adapted to dispose said gripper closely adjacent one of said webs so as to grip the severed sections.

6. In an apparatus of the character described, in combination, a plurality of sources of web supply, means adapted to feed webs from said sources, means adapted to sever sections from said webs, and mechanism adapted to adhesively assemble said sections in superposed relation comprising a plurality of supports, one for each section, means adapted to cause relative movement between said supports to cause superposition of said sections, one of said supports comprising a pneumatic gripper, means adapted to dispose said gripper closely adjacent one of said webs so as to grip the severed sections, an exhaust device adapted to energize said gripper and means adapted to connect said exhaust device with said gripper before the section adjacent thereto is severed from said web.

7. In an apparatus of the character described, in combination, a plurality of sources of web supply, means adapted to feed webs from said sources, means adapted to sever sections from said webs, mechanism adapted to adhesively assemble said sections in superposed relation comprising a plurality of supports, one for each section, means adapted to cause relative movement between said supports to cause superposition of said sections, one of said supports comprising a pneumatic gripper on which one of said webs is delivered by said feeding means, and means adapted to energize said gripper when said web has been delivered thereto.

8. In an apparatus of the character described, in combination, a plurality of sources of web supply, means adapted to feed webs from said sources, means adapted to sever sections from said webs, mechanism adapted to adhesively assemble said sections in superposed relation comprising a plurality of supports, one for each section; means adapted to cause relative movement between said supports to cause superposition of said sections, one of said supports comprising a pneumatic gripper on which one of said webs is delivered by said feeding means, an exhaust device adapted to communicate with said gripper, and means adapted to cut off communication between said exhaust device and said gripper while the said web is being delivered thereto, and to establish communication when said web has been delivered thereto.

9. In an apparatus of the character described, in combination, a plurality of sources of web supply, means adapted to feed webs from said sources, means adapted to sever sections from said webs, mechanism adapted to adhesively assemble said sections in superposed relation comprising a plurality of supports, one for each section, and means adapted to cause relative movement between said supports to cause superposition of said sections, each of said supports comprising a pneumatic gripper adapted to grip said sections, respectively.

10. In an apparatus of the character described, in combination, a plurality of sources of web supply, means adapted to feed webs from said sources, means adapted to sever sections from said webs, mechanism adapted to adhesively assemble said sections in superposed relation comprising a plurality of pneumatic grippers, one for each section, means adapted to move one of said grippers from a point closely adjacent the end of one of said webs to a point opposite but spaced from said other gripper, means adapted to move said other gripper toward said first-mentioned gripper, thereby assembling the web sections carried by the respective grippers, and means adapted to cause said grippers to be energized to grip during said movements thereof.

11. In an apparatus of the character described, in combination, a plurality of sources of web supply, means adapted to feed webs from said sources, means adapted to sever sections from said webs, mechanism adapted to adhesively assemble said sections in superposed relation comprising a plurality of pneumatic grippers, one for each section, means adapted to move one of said grippers from a point closely adjacent the end of one of said webs to a point opposite but spaced from said other gripper, means adapted to move said other griper toward said first-mentioned gripper, thereby assembling the web sections carried by the respective grippers, means adapted to cause said grippers to be energized to grip during said movements thereof, and means adapted to cause the deënergizing of one of said grippers after the said assembling of said sections.

12. In an apparatus of the character described, in combination, a plurality of sources of web supply, means adapted to feed webs from said sources, means adapted to sever sections from said webs, mechanism adapted to adhesively assemble said sections in superposed relation comprising a plurality of pneumatic grippers, one for each section, means adapted to move one of said grippers from a point closely adjacent the end of one of said webs to a point opposite but spaced from said other gripper, means adapted to move said other gripper toward said first-mentioned gripper, thereby assembling the web sections carried by the respective grippers, means adapted to cause said grippers to be energized to grip during said movements thereof, means adapted to cause the deënergizing of one of said grippers after the said assembling of said sections, and means adapted to move the still energized gripper relative to said other gripper in a direction away fom the web from which the adjacent section carried thereby was severed.

13. In an apparatus of the character described, in combination, a plurality of sources of web supply, means adapted to feed webs from said sources, means adapted to sever sections from said webs, mechanism adapted to adhesively assemble said sections in superposed relation comprising a plurality of pneumatic grippers, one for each section, means adapted to intermittently translate one of said grippers in a path spaced from and across the other gripper, and means adapted to move said other gripper toward and from said translatable gripper at a stationary point in said path.

14. In an apparatus of the character described, in combination, a plurality of sources of web supply, means adapted to feed webs from said sources, means adapted to sever sections from said webs, mechanism adapted to adhesively assemble said sections in superposed relation comprising a plurality of pneumatic grippers, one for each section, means adapted to intermittently translate one of said grippers in a path spaced from and across the other gripper, means adapted to move said other gripper toward said translatable gripper at a stationary point in said path and thereby assemble the sections carried by said grippers, folding mechanism, means adapted to cause said folding mechanism to fold a portion of one section on the other, and means adapted to cause said grippers to hold said sections in contact with each other during said folding operation.

15. In an apparatus of the character described, in combination, a plurality of sources of web supply, means adapted to feed webs from said sources, means adapted to sever sections from said webs, mechanism adapted to adhesively assemble said sections in superposed relation comprising a plurality of pneumatic grippers, one for each section, means adapted to intermittently translate one of said grippers in a path spaced from and across the other gripper, means adapted to move said other gripper toward said translatable gripper at a stationary point in said path and thereby assemble the sections carried by said grippers, folding mechanism comprising pressing jaws, means adapted to cause said folding mechanism to fold a portion of one section on the other, thereby bringing the folded portions between said jaws, means adapted to cause said grippers to hold said sections in contact with each other during said folding operation, and means adapted to cause said jaws to press said folded portion while the sections are so held in contact.

16. In an apparatus of the character described, in combination, a source of cover web supply, a source of body web supply, means adapted to feed web from said sources, means adapted to sever a section from each web, a pneumatic cover section gripper, a pneumatic body section gripper, and means adapted to assemble said sections comprising means adapted to dispose said body section gripper closely adjacent the body web so as to grip the body section after being severed and means adapted to cause relative movement between said grippers to superpose said sections.

17. In an apparatus of the character described, in combination, a source of cover web supply, a source of body web supply, means adapted to feed web from said sources, means adapted to sever a section from each web, a pneumatic cover section gripper, a pneumatic body section gripper, and means adapted to assemble said sections comprising means adapted to dispose said body section gripper closely adjacent the body web so as to grip the body section after being severed, means adapted to move said body section gripper to position opposite the other gripper after the section is gripped thereto and means adapted to cause further relative movement between said grippers to superpose said sections.

18. In an apparatus of the character described, in combination, a source of cover web supply, a source of body web supply, means adapted to feed web from said sources, means adapted to sever a section from each web, a pneumatic cover section gripper, a pneumatic body section gripper, and means adapted to assemble said sections comprising means adapted to dispose said body section gripper closely adjacent the body web so as to grip the body section after being severed, means adapted to move said body section gripper to position opposite the other gripper after the section is gripped thereto and hold the body section gripper temporarily at rest in said opposite position and means adapted to cause further relative movement between said grippers to superpose said sections.

19. In an apparatus of the character described, in combination, a source of cover web supply, a source of body web supply, means adapted to feed web from said sources, means adapted to sever a section from each web, a pneumatic cover section gripper, a pneumatic body section gripper, and means adapted to assemble said sections comprising means adapted to dispose said body section gripper closely adjacent the body web so as to grip the body section after being severed, means adapted to move said body section gripper to position opposite the other gripper after the section is gripped thereto, means adapted to cause further relative movement between said grippers to superpose said sections and means to move said body section gripper from said opposite position after the assembly of said sections.

20. In an apparatus of the character described, in combination, a source of cover web supply, a source of body web supply, means adapted to feed web from said sources, means adapted to sever a section from each web, a pneumatic cover section gripper, a pneumatic body section gripper, and means adapted to assemble said sections comprising means adapted to dispose said body section gripper closely adjacent the body web so as to grip the body section after being severed, means adapted to move said body section gripper to position opposite the other gripper after the section is gripped thereto, means adapted to cause further relative movement between said grippers to superpose said sections, a movable former and means adapted to move said body section gripper from said opposite position and dispose the sections carried thereby in the path of said former.

21. In an apparatus of the character described, in combination, a source of cover web supply, a source of body web supply, means adapted to feed web from said sources, means adapted to sever a section from each web, a pneumatic cover section gripper, a pneumatic body section gripper, and means adapted to assemble said sections comprising means adapted to dispose said body section gripper closely adjacent the body web so as to grip the body section after being severed, means adapted to move said body section gripper to position opposite the other gripper after the section is gripped thereto, means adapted to cause further relative movement between said grippers to superpose said sections, a movable former, means adapted to move said body section gripper from said opposite position and dispose the sections carried thereby in the path of said former, means carried by the former adapted to clamp said sections thereto and means adapted to de-energize said body section gripper after said sections have been clamped to said former.

22. In an apparatus of the character described, in combination, a source of cover web supply, a source of body web supply, means adapted to feed web from said sources, means adapted to sever a section from each web, a pneumatic cover section gripper opposite the path of feed of the cover web, a pneumatic body section gripper, and mechanism adapted to assemble said sections comprising means adapted to energize said cover section gripper when the cover web has been fed into position thereon and means adapted to cause relative movement between said grippers to superpose said sections.

23. In an apparatus of the character described, in combination, a source of cover web supply, a source of body web supply, means adapted to feed web from said sources, means adapted to sever a section from each web, a pneumatic cover section gripper opposite the path of feed of the cover web, a pneumatic body section gripper, and mechanism adapted to assemble said sections comprising means adapted to energize said cover section gripper when the cover web has been fed into position thereon, means adapted to move said body section gripper into position opposite said cover section gripper and means adapted to cause further relative movement between said grippers to superpose said sections.

24. In an apparatus of the character described, in combination, a source of cover web supply, a source of body web supply, means adapted to feed web from said sources, means adapted to sever a section from each web, a pneumatic cover section gripper opposite the path of feed of the cover web, a pneumatic body section gripper, and mechanism adapted to assemble said sections comprising means adapted to energize said cover section gripper when the cover web has been fed into position thereon, means adapted to move said body section gripper into position opposite said cover section gripper and means adapted to move said cover section gripper toward said body section gripper when in said opposite position and thereby assemble said sections.

25. In an apparatus of the character described, in combination, a source of cover web supply, a source of body web supply, means adapted to feed web from said sources, means adapted to sever a section from each web, a resiliently supported pneumatic cover section gripper opposite the path of feed of the cover web, a pneumatic body section gripper, and mechanism adapted to assemble said sections comprising means adapted to energize said cover section gripper when the cover web has been fed into position thereon, means adapted to move said body section gripper into position opposite said cover section gripper and means adapted to move said cover section gripper toward said body section gripper when in said opposite position and thereby assemble said sections.

26. In an apparatus of the character described, in combination, a source of cover web supply, a source of body web supply, means adapted to feed web from said sources, means adapted to sever a section from each web, a resiliently supported pneumatic cover section gripper opposite the path of feed of the cover web, a pneumatic body section gripper, and mechanism adapted to assemble said sections comprising means adapted to energize said cover section gripper when the cover web has been fed into position thereon, means adapted to move said body section gripper into position opposite said cover section gripper, means adapted to move said cover section gripper toward said body section gripper when in said opposite position and thereby assemble said sections and means to limit the movement of said cover section gripper toward said body section gripper.

27. In an apparatus of the character described, in combination, a source of cover web supply, a source of body web supply, means adapted to feed web from said sources, means adapted to sever a section from each web, a pneumatic cover section gripper opposite the path of feed of the cover web, a pneumatic body section gripper, and mechanism adapted to assemble said sections comprising means adapted to energize said cover section gripper when the cover web has been fed into position thereon, means adapted to move said body section gripper into position opposite said cover section gripper, means adapted to move said cover section gripper toward said body section gripper when in said opposite position and thereby assemble said sections and means adapted to hold said grippers temporarily at rest when the sections are superposed.

28. In an apparatus of the character described, in combination, a source of cover web supply, a source of body web supply, means adapted to feed web from said sources, means adapted to sever a section from each web, a pneumatic cover section gripper opposite the path of feed of the cover web, a pneumatic body section gripper, and mechanism adapted to assemble said sections comprising means adapted to energize said cover section gripper when the cover web has been fed into position thereon, means adapted to move said body section gripper into position opposite said cover section gripper, means adapted to move said cover section gripper toward said body section gripper when in said opposite position and thereby assemble said sections, means adapted to hold said grippers temporarily at rest when the sections are superposed and means adapted to move said cover section gripper from said body section gripper after the sections are superposed.

29. In an apparatus of the character described, in combination, a source of cover web supply, a source of body web supply, means adapted to feed web from said sources, means adapted to sever a section from each web, a pneumatic cover section gripper opposite the path of feed of the cover web, a pneumatic body section gripper, and mechanism adapted to assemble said sections comprising means adapted to energize said cover section gripper when the cover web has been fed into position thereon, means adapted to move said body section gripper into position opposite said cover section gripper, means adapted to move said cover section gripper toward said body section gripper when in said opposite position and thereby assemble said sections, means adapted to hold said grippers temporarily at rest when the sections are superposed, means adapted to move said cover section gripper from said body section gripper after the sections are superposed and means adapted to deënergize said cover section gripper before beginning said movement away from said body section gripper.

30. In an apparatus of the character described, in combination, a source of cover web supply, a source of body web supply, means adapted to feed webs from said sources, means adapted to sever a section from each web, a pneumatic cover section gripper opposite the path of feed of the cover web, a pneumatic body section gripper, and mechanism adapted to assemble said sections comprising means adapted to energize said cover section gripper when the cover web has been fed into position thereon, means adapted to move said body section gripper in position opposite said cover section gripper, means adapted to move said cover section gripper toward said body section gripper when in said opposite position and thereby assemble said sections and means adapted to fold the edge of the cover section around the edge of the body section and adhesively secure the interfolded parts.

31. In an apparatus of the character described, in combination, a source of cover web supply, a source of body web supply, means adapted to feed webs from said sources, means adapted to sever a section from each web, a pneumatic cover section gripper opposite the path of feed of the cover web, a pneumatic body section gripper and mechanism adapted to assemble said sections comprising means adapted to energize said cover section gripper when the cover web has been fed into position thereon, means adapted to move said body section gripper in position opposite said cover section gripper, means adapted to move said cover section gripper toward said body section gripper when in said opposite position and thereby assemble said sections and means adapted to fold the edge of the cover section around the edge of the body section and adhesively secure the interfolded parts comprising a combined folding and pressing jaw and a separate presser jaw adapted to receive the interfolded parts therebetween.

32. In an apparatus of the character described, in combination, a source of cover web supply, a source of body web supply, means adapted to feed webs from said sources, means adapted to sever a section from each web, a pneumatic cover section gripper opposite the path of feed of the cover web, a pneumatic body section gripper, and mechanism adapted to assemble said sections comprising means adapted to energize said cover section gripper when the cover web has been fed into position thereon, means adapted to move said body section gripper in position opposite said cover section gripper, means adapted to move said cover section gripper toward said body section gripper when in said opposite position and thereby assemble said sections and means adapted to fold the edge of the cover section around the edge of the body section and adhesively secure the interfolded parts comprising a combined folding and pressing jaw, a separate presser jaw adapted to receive the interfolded parts therebetween and means adapted to move the combined folding and pressing jaw toward said presser jaw and thereby press the interfolded parts.

33. In an apparatus of the character described, in combination, a source of cover web supply, a source of body web supply, means adapted to feed webs from said sources, means adapted to sever a section from each web, a pneumatic cover section gripper opposite the path of feed of the cover web, a pneumatic body section gripper, and mechanism adapted to assemble said sections comprising means adapted to energize said cover section gripper when the cover web has been fed into position thereon, means adapted to move said body section gripper in position opposite said cover section gripper, means adapted to move said cover section gripper toward said body section gripper when in said opposite position and thereby assemble said sections and means adapted to fold the edge of the cover section around the edge of the body section and adhesively secure the interfolded parts comprising a combined folding and pressing jaw, a separate presser jaw adapted to receive the interfolded parts therebetween and means adapted to move the combined folding and pressing jaw out of the plane of the assembled sections after folding is accomplished.

34. In an apparatus of the character described, in combination, a source of cover web supply, a source of body web supply, means adapted to feed webs from said sources, means adapted to sever a section from each web, a pneumatic cover section gripper opposite the path of feed of the cover web, a pneumatic body section gripper and mechanism adapted to assemble said sections comprising means adapted to energize said cover section gripper when the cover web has been fed into position thereon, means adapted to move said body section gripper in position opposite said cover section gripper, means adapted to move said cover section gripper toward said body section gripper when in said opposite position and thereby assemble said sections, means adapted to fold the edge of the cover section around the edge of the body section and adhesively secure the interfolded parts comprising a combined folding and pressing jaw, a separate presser jaw adapted to receive the interfolded parts therebetween, means adapted to move the combined folding and pressing jaw out of the plane of the assembled sections after folding is accomplished and means adapted to move the combined folding and pressing jaw toward said presser jaw and thereby press the interfolded parts.

35. In an apparatus of the character described, in combination, a source of cover web supply, a source of body web supply, means adapted to feed web from said sources, means adapted to sever a section from each web and assemble said sections in superposed relation comprising a pneumatic gripper providing a supporting member adapted to receive the end portion of the cover web, and a cutter adapted to coöperate with said support to sever the cover web.

36. In an apparatus of the character described, in combination, a source of cover web supply, a source of body web supply, means adapted to feed web from said sources, means adapted to sever a section from each web and assemble said sections in superposed relation comprising a pneumatic gripper over which the cover web is fed, and a reciprocatory cutter adapted to coöperate with said gripper to sever a section from said cover web.

37. In an apparatus of the character described, in combination, a source of cover web supply, a source of body web supply, means adapted to feed web from said sources, and means adapted to sever a section from each web and assemble said sections in superposed relation comprising a member having a cutter and a slitter adapted to operate to slit said web and sever a section therefrom containing said slit.

38. In an apparatus of the character described, in combination, a source of body web supply, a source of cover web supply, means adapted to feed web from said sources, means adapted to sever sections therefrom and assemble said sections in superposed relation comprising a pneumatic gripper, a slidably mounted rod, connections between said rod and gripper, and means adapted to slide said rod.

39. In an apparatus of the character described, in combination, a source of body web supply, a source of cover web supply, means adapted to feed web from said sources, means adapted to sever sections therefrom and assemble said sections in superposed relation comprising a hollow member having openings communicating with the exterior surface, thereby providing a pneumatic gripper face, and supporting means for said member comprising a hollow arm communicating with the chamber of said member.

40. In an apparatus of the character described, in combination, a plurality of pneumatic grippers, means adapted to dispose blanks so as to be pneumatically gripped by said grippers, and mechanism adapted to adhesively assemble said blanks comprising means adapted to cause relative rectilinear movement of said grippers toward and from each other.

41. In an apparatus of the character described, in combination, a support having a pneumatic gripper face, a transfer device comprising a pneumatic gripper, means adapted to intermittently move said transfer device in a predetermined path, means adapted to move said support toward and from said transfer device when the latter is at rest at a predetermined point in its path of movement, and means adapted to energize and deënergize said grippers at predetermined times.

42. In an apparatus of the character described, in combination, a supporting block having a pneumatic gripper face, means adapted to energize and deënergize said face, means adapted to feed a blank onto said face, a transfer device comprising a pneumatic gripper, means adapted to energize and deënergize said gripper, means adapted to move said gripper from a position at one side of said gripper face to a position at the opposite side thereof, and means adapted to cause relative approaching and receding movement between said gripper and said gripper face between said positions.

43. In an apparatus of the character described, in combination, a frame, a hollow block supported thereby providing a pneumatically gripping blank support, rods guided in said frame, hollow arms carried by said rods, said arms terminating in pneumatic gripping blank supports, means adapted to energize and deënergize said grippers, means adapted to reciprocate said rods transversely of said block, and means adapted to reciprocate said block in a plane transversely of the path of movement of said rods.

44. In an apparatus of the character described, in combination, glue-carrying means adapted to apply glue to a face of a web on longitudinal lines spaced apart transversely of the web, means adapted to guide a web into contact with said glue-carrying means, means adapted to feed said web relative to said glue-carrying means comprising a pair of web-feeding rollers, one opposite either face of said web, one of said rollers engaging an unglued portion of the glued face of the web, means adapted to rotate one of said rollers, a reciprocatory member having a gripper adapted to grasp the glued face of said web aside from the glue thereon, means adapted to open and close said gripper at predetermined times, and means adapted to successively sever said web.

45. In an apparatus of the character described, in combination, glue-carrying means adapted to apply glue to a face of a web on longitudinal lines spaced apart transversely of the web, means adapted to guide a web into contact with said glue-carrying means, means adapted to feed said web relative to said glue-carrying means comprising a pair of web-feeding rollers, one opposite either face of said web, one of said rollers engaging an unglued portion of the glued face of the web, means adapted to rotate one of said rollers, a reciprocatory member having a gripper adapted to contact the glued face of said web only at the unglued portion, means adapted to open and close said gripper at predetermined times, and means adapted to successively sever said web.

46. In an apparatus of the character described, in combination, glue-carrying means adapted to apply glue to a face of a web on longitudinal lines spaced apart transversely of the web, means adapted to guide a web into contact with said glue-carrying means, means adapted to feed said web relative to said glue-carrying means comprising a pair of web-feeding rollers, one opposite either face of said web, one of said rollers having a rough surface engaging an unglued portion of the glued face of the web, means adapted to rotate the other roller, a reciprocatory member comprising a gripper jaw adapted to contact the glued face of said web only at the unglued portion, means adapted to open and close said gripper at predetermined times, and means adapted to successively sever said web.

47. In an apparatus of the character described, in combination, glue-carrying means comprising rotatable surfaces axially spaced apart, means adapted to guide a web into contact with said surfaces transversely of the axis of said surfaces, a pair of web-feeding rollers between which the web passes, one of said rollers being constructed to engage the glued face of the web only at an unglued portion, a reciprocatory gripper comprising a gripper jaw arranged to contact the glued face of said web only at an unglued portion, means adapted to open and close said gripper at predetermined times, means adapted to successively sever said web, and means adapted to rotate one of said feeding rollers to provide slack of web for feed by said gripper.

48. In an apparatus of the character described, in combination, glue-carrying means comprising rotatable surfaces axially spaced apart, means adapted to guide a web into contact with said surfaces transversely of the axis of said surfaces, a pair of web-feeding rollers between which the web passes, one of said rollers being constructed to engage the glued face of the web only at an unglued portion, a reciprocatory gripper comprising a gripper jaw arranged to contact the glued face of said web only at an unglued portion, means adapted to open and close said gripper at predetermined times, means adapted to successively sever said web, means adapted to rotate one of said feeding rollers to provide slack of web for feed by said gripper, and a clamping finger adapted to contact the unglued portion of the glued face of said web and restrain movement of said web.

49. In an apparatus of the character described, in combination, means adapted to glue a web, means adapted to thereafter guide and feed said web without coming into contact with the glue on said web, a pneumatic gripper to which said web is fed, means adapted to successively sever said web while grasped by said gripper, a second pneumatic gripper adapted to carry a strip to be assembled with the section severed from said web, means adapted to cause relative movement between said pneumatic grippers to assemble said strip and section in superposed relation, and means adapted to energize and deënergize said pneumatic grippers at predetermined times.

50. In an apparatus of the character described, in combination, means adapted to apply glue to a web on lines spaced apart so as to provide an unglued portion of web therebetween, means adapted to feed said web continuously relative to said glue-applying means, a table having a pneumatic gripper face, means adapted to guide said web to a position adjacent said table, a reciprocatory gripper comprising a finger adapted to grasp said web at an unglued portion of the glued face thereof and feed the same onto the pneumatic gripper face of said table, means adapted to sever said web, and pneumatic means adapted to coöperate with said table to assemble another section with said severed section.

51. In an apparatus of the character described, in combination, glue-carrying means, means adapted to guide a web into contact with said glue-carrying means, means adapted to feed said web relative to said glue-carrying means, a pneumatic gripper onto which said web is fed, a second pneumatic gripper, means adapted to move said second pneumatic gripper relative to the path of said web, means adapted to energize and deënergize said pneumatic grippers at predetermined times, means adapted to successively sever said web, and means adapted to supply blanks for said second pneumatic gripper.

52. In an apparatus of the character described, in combination, a support, means adapted to feed a web intermittently so that a portion thereof lies on said support, means adapted intermittently to feed another web toward said support in a direction at an angle to the direction of feed of the first mentioned web, means adapted to sever from the first mentioned web the portion lying on said support, means adapted to slit said portion at its edge, and transversely of the direction of feed of said portion, means adapted to sever a section from the second mentioned web, means adapted to assemble the severed portion and section in superposed relationship after they have been severed, and means adapted to fold an edge portion of one of said sections over the edge of the other section after they have been assembled.

53. In an apparatus of the character described, in combination, a pair of supports providing pneumatic grippers between which is relative movement to transfer a blank from one to the other, a third support adapted to position a blank for reception by the transferring gripper, and means to cause said relative movement.

54. In an apparatus of the character described, in combination, a pair of supports providing pneumatic grippers between which is relative movement to transfer a blank from one to the other, a third support adapted to position a blank for reception by the transferring gripper, means to cause said relative movement, and means to energize and deënergize said pneumatic grippers at predetermined times.

55. In an apparatus of the character described, in combination, a pair of supports providing pneumatic grippers between which is relative movement to transfer a blank from one to the other, a third support adapted to position a blank for reception by the transferring gripper, means to cause said relative movement, and a slitter coöperative with one member of said pair of supports.

56. In an apparatus of the character described, in combination, a pair of supports providing pneumatic grippers between which is relative movement to transfer a blank from one to the other, a third support adapted to position a blank for reception by the transferring gripper, means to cause said relative movement, and a cutter coöperative with said third support.

57. In an apparatus of the character described, in combination, a pair of supports providing pneumatic grippers between which is relative movement to transfer a blank from one to the other, a third support adapted to position a blank for reception by the transferring gripper, means to cause said relative movement, and a web cutter coöperative with one member of said pair of supports.

58. In an apparatus of the character described, in combination, a pair of supports providing pneumatic grippers between which is relative movement to transfer a blank from one to the other, a third support adapted to position a blank for reception by the transferring gripper, means to cause said relative movement, and a reciprocatory member carrying a web cutter and web slitter adapted to coöperate with one member of said pair of supports.

59. In an apparatus of the character described, in combination, a pair of supports providing pneumatic grippers between which is relative movement to transfer a blank from one to the other, a third support adapted to position a blank for reception by the transferring gripper, means to cause said relative movement, a reciprocatory member carrying a web cutter and web slitter adapted to coöperate with one member of said pair of supports, and a web cutter coöperative with said third support.

In testimony whereof I affix my signature, in the presence of two witnesses.

WILLIAM SCHELBLE.

Witnesses:
  L. C. PALMER,
  H. C. COPPINS.